May 20, 1969     R. T. MARTIN     3,445,246
POTATO STORAGE METHOD
Filed Nov. 1, 1966
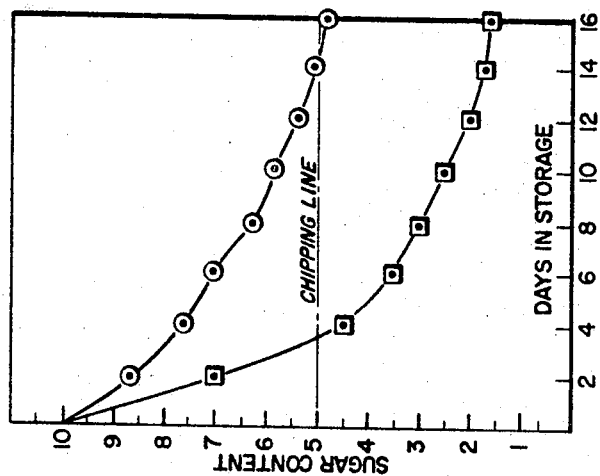
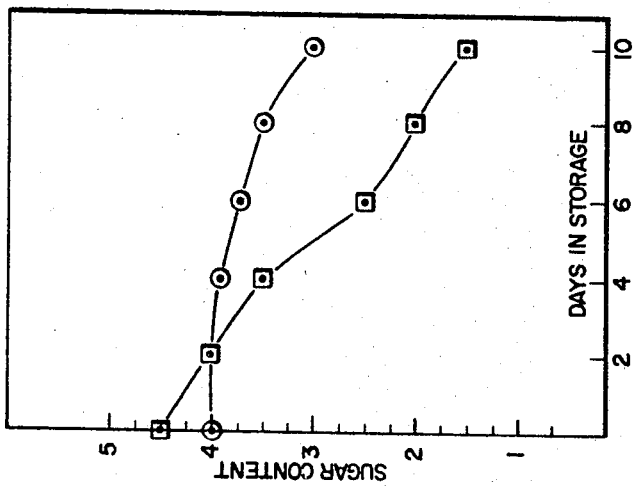
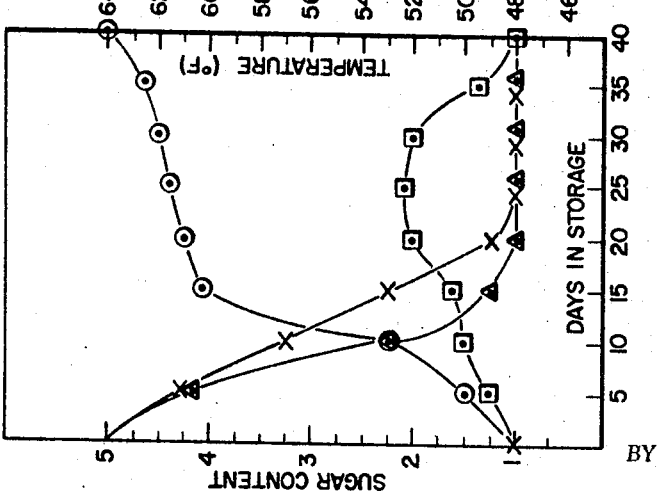
INVENTOR.
ROBERT T. MARTIN
HIS ATTORNEY

United States Patent Office 3,445,246
Patented May 20, 1969

3,445,246
POTATO STORAGE METHOD
Robert T. Martin, 1708 East 4800 South,
Salt Lake City, Utah 84105
Filed Nov. 1, 1966, Ser. No. 591,300
Int. Cl. A23b 7/00
U.S. Cl. 99—154                                    15 Claims This invention relates to a method for storing potatoes, and in particular, relates to a method for accelerating the conversion of sugar in potatoes and for preventing an increase in sugar concentration in stored potatoes while simultaneously preventing potato rot and decay.

It is established practice to store potatoes and other similar crops, after they have been harvested, in enclosed storage structures until they can be shipped to the various markets. In storage of this type, the potatoes are merely piled in massive stacks in the storage structure and maintained within a predetermined temperature range, i.e., generally in the range of about 35 to 45 degrees Fahrenheit. If said potatoes are stored at a temperature above this range, they soon begin to decay and rot and when this occurs they cannot be used for conventional purposes. Accordingly, during the hot summer months it has heretofore been necessary to use specially designed cooler equipment to maintain said potatoes at a low temperature. It has, however, been found that when potatoes are stored at temperatures below 45 degrees Fahrenheit starch within the potato is converted to sugar. When the sugar content is stored potatoes becomes relatively high, such potatoes have the tendency to darken upon being cooked. Accordingly, they cannot be used for chipping purposes, i.e., they cannot be used to make potato chips, because they result in chips having a brown color. It is known that the sugar content in stored potatoes can be reduced by increasing the storage temperature of potatoes to a temperature above about 45 degrees Fahrenheit. The increased temperature results in the acceleration of a vital process in the potato tuber known as respiration. During respiration the sugar content of the stored potatoes is reduced through the production of carbon dioxide and water. If the potatoes which were originally stored at low temperatures are maintained under the aforementioned increased temperature conditions, their sugar content is ultimately reduced to a point which allows said potatoes to be commercially chipped without their exhibiting a darkened color. However, because of the substantial period of time required for this conversion and because of the substantial period of time required for this conversion and because of the high temperature storage conditions many of the potatoes thus stored are rendered unusable because of decay and rot. In addition, the high temperature conditions often cause the potatoes to dehydrate, which results in a two-fold problem. Firstly, the potatoes lose much of their bulk resulting in a loss in their market value, and, secondly, water is an essential component within the potato during its respiration period, i.e., when the potato's water content is lowered the respiration cycle is retarded, thereby substantially increasing the time required to lower the sugar content of the stored potato. Attempts have been made to overcome this problem by increasing the humidity of the environment surrounding the stored potatoes. However, this generally increases the rate of decay of the stored potatoes and, in addition, causes them to sprout. Because of the aforementioned problems, a substantial number of the potatoes stored in a high humidity environment and at high temperatures become diseased thereby causing substantial loss. Examples of such storage diseases are blight, dry rot, gangrene, watery rot, black heart, etc. Accordingly, a great need has arisen for a method to store potatoes and other vegetables in such a fashion so as to lower and/or prevent sugar buildup while simultaneously preventing decay and rot.

It is accordingly an object of my invention to provide a method for storing potatoes and other vegetables which overcomes the defects and disadvantages heretofore found in such storage methods.

Another object of my invention is to provide a method for storing potatoes which prevents sugar buildup within said potatoes.

Still another object of my invention is to provide a method for storing potatoes which prevents sugar buildup while simultaneously preventing loss due to decay and rot.

Still another object of my invention is to provide a method for accelerating the conversion of sugar in stored potatoes when said potatoes are stored under high temperature conditions.

Still another object of my invention is to provide a method for maintaining a high humidity environment in a vegetable storage structure without causing decay and rot.

Still another object of my invention is to provide a method for converting high sugar content potatoes to potatoes that are suited for chipping.

Still another object of my invention is to provide a method for storing vegetables under high temperature conditions without causing said vegetables to dehydrate or rot.

Still other objects and attendant advantages of my invention will become apparent to those skilled in the art as the invention is better understood by reference to the detailed description appearing hereinafter.

The foregoing objects and attendant advantages of my invention are achieved by storing potatoes or other similar vegetables at temperatures generally above 45 degrees Fahrenheit in an atmosphere containing 0.001 to 10 parts per million ozone. Preferably the environment is also maintained at a relative humidity of about 75 to 98 percent. To accelerate the conversion of sugar in potatoes which have been stored at temperatures below 45 degrees Fahrenheit the storage temperature of said potatoes is increased to a temperature of at least 45 degrees Fahrenheit while said potatoes are maintained in an atmosphere containing 0.001 to 10 parts per million ozone until the sugar content of said potatoes has reached a predetermined level. The rate of sugar conversion is further increased by maintaining the relative humidity of the atmosphere at about 75 to 98 percent. In the most preferred embodiment of my invention, the potatoes are stored during their sweat period at a temperature of about 45 to 55 degrees and in an ozone rich environment having a relative humidity of 85 to 95 percent. At the end of said sweat period, in one embodiment of my invention, the temperature of the potatoes may be raised at the rate of about 0.5 to 5 degrees Fahrenheit per day, while maintaining said environmental conditions, until the shipping temperature of the potatoes is reached.

So that the results obtainable from the invention may be more readily understood, reference is made to the accompanying drawings which are offered by way of example only and are not to be taken as limiting the invention, the scope of which is defined by the appended claims.

FIGURE 1 is a graphic summary of the data described in Examples 1 and 2, showing the sugar content of potatoes stored according to the method of my invention as compared to potatoes stored in a conventional fashion.

FIGURE 2 is a graphic summary of the data described in Example 3, showing the acceleration of sugar conversion in potatoes stored according to the method of my invention.

FIGURE 3 is a graphic summary of the data described in Example 4, showing the acceleration of sugar conversion in potatoes stored according to the method of my invention.

After potatoes are harvested the potato tuber becomes a dormant but living organ and some change in its chemical composition is inevitable as a result of processes which continue during said dormant period such as the conversion of starch to sugar and the oxidation of sugar, with the production of carbon dioxide, during respiration. Dry matter is thus lost during storage at a rate depending upon the rate of respiration, and in addition, the starch/sugar ratio may be altered according to the equilibrium struck between the conversion of starch to sugar on the one hand, and the oxidation of sugar on the other. There may also be loss of water from the tubers, the extent of which, for all practical purposes, depends upon the relative humidity of the environment and the rate of air movement over the tubers. At temperatures of about 42 to 47 degrees Fahrenheit the aforementioned reactions are in equilibrium during the dormant period wherein the concentration of sugar in the tuber remains approximately constant. If, however, the potato tuber is stored below the aforementioned temperature range, the content of sugar is increased. Conversely, when the tuber is stored at temperatures above this range, respiration is accelerated, thereby lowering the sugar content. As previously indicated, potato tubers are conventionally stored at cooler temperatures, i.e., 33 to 45 degrees Fahrenheit, to prevent tuber rot and decay while still maintaining the potatoes at a temperature which is high enough to prevent freezing. At temperatures within this range, the respiration process is retarded wherein the sugar concentration in stored tubers is substantially increased. If said tubers are stored under these conditions for a substantial period of time, the sugar concentration will continue to increase until the potatoes are no longer edible.

By using the process of my invention, potatoes which have been stored at low temperatures may be treated to accelerate the respiration process, thereby lowering the sugar content in such potatoes. In addition, new potatoes may be stored under temperature conditions which prevent the accumulation of sugars in the potato tuber and also prevent various rots and decays which are caused by storing. In practicing my method, potatoes having a high sugar content, which have previously been stored at low temperatures, are maintained under elevated temperature conditions, i.e., about 45 to 75 degrees Fahrenheit, preferably about 45 to 65 degrees Fahrenheit, and most preferably about 50 to 55 degrees Fahrenheit. In addition, said potatoes being treated by my process are maintained in an ozone environment having at least 0.001 part per million ozone. The upper ozone concentration which may be used according to the method of my invention is determined by the storage facilities being used. If, for example, the facilities are such that human beings must work therein the upper ozone concentration must be set at a limit which can be tolerated by said human beings, i.e., about 0.1 part per million. A higher concentration may be used when humans are not required to enter the storage enclosure. Accordingly, I prefer to use an ozone concentration of about 0.001 to 10 parts per million and most preferably about 0.005 to 0.1 part per million.

In the most preferred embodiment of my invention, the relative humidity of the environment is maintained so as to prevent potatoes stored according to my method from dehydrating. This may be accomplished by maintaining the relative humidity at about 75 to 99 percent, and preferably at about 80 to 98 percent, and most preferably about 85 to 96 percent. The high humidity ozone environment accomplishes two functions other than maintaining the moisture content in the stored potatoes. Firstly, it accelerates the respiration process of the potato tubers thereby accelerating the conversion of sugars contained in said tuber, and secondly, the water and ozone combine to form hydrogen peroxide which coats the stored potatoes to act as a preservative, thereby killing bacteria and fungus which cause storage diseases of the type previously described. Since it is conventional practice to store newly harvested potatoes in a bulk fashion, it is preferable to circulate the high humidity ozone environment through the potato stacks to ensure treatment of all of the stored potatoes.

In another mode of practice of my invention, newly harvested potatoes are stored in a high humidity ozone environment of the type previously described. Potatoes thus stored may be very rapidly converted to ones having a very low sugar content. The respiration process of newly harvested potatoes has been shown to proceed in an accelerated fashion until an equilibrium state is obtained between the conversion of starch to sugar on the one hand and the respiration process on the other. At this point the respiration process slows down. This initial respiration period is called the potatoes "sweat" period or the buildup of the pariderm. Accordingly, by storing newly harvested potatoes according to the method of my invention, the rate of respiration is even further increased during the "sweat" period thereby preventing excessive sugar buildup and also lowering the potato tuber's sugar content in a very short time to a point which is acceptable for all potato uses including chipping. If additional storing is required after the initial storing period the ozone and water environment, of course, retard bacteria and fungus growth which prevents decay and rot. Accordingly, potatoes thus stored can be used at any time after their initial short storage treatment for any conventional purpose including chipping.

Since sprouting is encouraged when potato tubers are stored in an environment having a high relative humidity and which is also maintained at a relatively high temperature, in the preferred embodiment of my invention said potatoes are maintained in the treating environment at a temperature of about 50 to 55 degrees Fahrenheit until about 4 to 40 days before said potatoes are to be shipped. At this time, the temperature of the potatoes is slowly raised at the rate of about 0.5 to 5 degrees Fahrenheit per day until the proper shipping temperature is obtained. This procedure minimizes the tendency for the potato tubers to sprout while providing a method for minimizing the sugar content in the potatoes which are to be shipped. It is also to be noted that in the most preferred embodiment of my invention the potatoes are stored under substantially constant temperature conditions, i.e., the storage temperature is not fluctuated, unless said potatoes are about to be shipped, in which event said temperature is slowly raised as previously indicated. For example, if a temperature of 50 degrees Fahrenheit is selected as the desired storage temperature it is preferable that this temperature be maintained within ±1 degree Fahrenheit, and most preferably, ±½ degree Fahrenheit.

As previously indicated, it is preferred that the environment surrounding the potatoes stored according to the method of my invention is circulated. This is preferably accomplished through the use of a device such as that described in my copending United States patent application, Ser. No. 585,106, filed Oct. 7, 1966, now U.S. Pat. No. 3,339,475 which relates to an apparatus for controlling the environment in food storage structures, and in particular to an apparatus for controlling atmospheric environment surrounding potatoes which are stored in conventional potato storage enclosures. My process is also adapted to be used while vegetables are being shipped to prevent sugar buildup and rot during this time. In using my process in this fashion the aforementioned device may be easily installed in conventional transportation means such as railroad cars, trucks, etc.

The following examples will illustrate a mode of practice of my invention and will demonstrate the results obtainable thereby:

EXAMPLE 1

1000 sacks of newly harvested Kennebec potatoes having a harvest pulp temperature of 64 degrees Fahrenheit were placed in a storage cellar which was maintained at a substantially constant temperature of 48 degrees Fahrenheit. The atmosphere surrounding said potatoes was treated to contain about 0.05 part per million ozone and was maintained at a relative humidity of between 90 and 95 percent. Said atmosphere was then continually circulated past said potatoes. The relative sugar concentration and pulp temperature of a sample of the stored potatoes was measured every five days over a forty day storage period. At the end of the forty day period the potatoes showed no sign of secondary rot due to storage and the sugar content of said potatoes was substantially equivalent to the sugar content at the time said potatoes were harvested.

EXAMPLE 2

1000 sacks of newly harvested Kennebec potatoes having a harvest pulp temperature of 64 degrees Fahrenheit were placed in a storage cellar which was maintained at a substantially constant temperature of 48 degrees Fahrenheit. The potatoes thus stored were harvested from the same field and at the same time as the potatoes tested in Example 1. The atmosphere surrounding said potatoes was maintained at a relative humidity of between 90 and 95 percent for a period of 40 days. During this time, the relative sugar concentration and pulp temperature of a sample of the stored potatoes was measured every five days. At the end of the 40 day storage period approximately 20 percent of the stored potatoes showed signs of secondary rot and decay due to storage. The relative sugar concentration of the potatoes stored in the tests of Examples 1 and 2 were compared and the following results were obtained:

| Storage time (days) | Sugar content (treated) | Sugar content (untreated) | Difference |
|---|---|---|---|
| 0 | 1.00 | 1.00 | None |
| 5 | 1.25 | 1.50 | 0.25 |
| 10 | 1.50 | 2.25 | 0.75 |
| 15 | 1.62 | 4.00 | 2.38 |
| 20 | 2.00 | 4.25 | 2.25 |
| 25 | 2.00 | 4.37 | 2.37 |
| 30 | 2.00 | 4.50 | 2.50 |
| 35 | 1.37 | 4.65 | 3.28 |
| 40 | 1.00 | 5.00 | 4.00 |

The pulp temperatures of the treated potatoes remained higher for the first 25 days of treatment than the pulp temperature of the untreated potatoes. During this same period of time the treated potatoes showed substantially less increase in sugar content than the untreated potatoes. The correlation between sugar content and pulp temperature is shown in FIGURE 1 for the tests run in Examples 1 and 2.

EXAMPLE 3

2000 pounds of Kennebec potatoes having a relative sugar content of 4.5 were placed in potato storage bins in an enclosed storage cellar. The atmosphere surrounding said potatoes was treated to contain about 0.1 part per million ozone and was maintained at a relative humidity of between 90 and 95 percent. The temperature in the storage enclosure was maintained at 60 degrees Fahrenheit. The potatoes thus stored were tested every two days for sugar content and at the end of 10 days the relative sugar content in the stored potatoes was 1.5. A second test was then run with 2000 pounds of Kennebec potatoes having a relative sugar content of 4.0. The conditions of the second test were similar to the first test with the exception that the ozone was removed from the atmosphere which surrounded the stored potatoes. At the end of the 10 day testing period the relative sugar concentration in the treated potatoes was 1.5 as compared to the 3.0 of the untreated potatoes. In addition, the untreated potatoes showed signs of secondary rot due to the high storage temperature and humidity conditions. The comparative sugar contents as measured in the two tests is shown in FIGURE 2.

EXAMPLE 4

Idaho Russett potatoes stored for a period of 6 months at a temperature of about 35 to 40 degrees Fahrenheit were separated into two groups of 1000 sacks each. The initial relative sugar content of the stored potatoes was 10. One group of the potatoes was placed in a storage cellar which was maintained at a constant temperature of about 50 degrees Fahrenheit and the atmosphere surrounding said potatoes was treated to contain about 0.03 part per million ozone and a relative humidity of between 90 and 95 percent. The second group of potatoes was stored under similar conditions with the exception that no ozone was present in the atmosphere surrounding said potatoes. The relative sugar content of a sample of the stored potatoes was measured every two days for a period of 16 days. At the end of the 16 day period substantially all of the potatoes stored in the ozone atmosphere were capable of being chipped, whereas only about 5 percent of the potatoes otherwise stored were chippable. In addition about 15 percent of the untreated potatoes showed signs of secondary decay and rot due to the high temperature and humidity conditions which were present during their storage. In contrast, the potatoes stored in the ozone environment showed essentially no secondary breakdowns. The sugar content of the untreated and treated potatoes is listed as follows:

| Storage time (days) | Sugar content (treated) | Sugar content (untreated) | Difference |
|---|---|---|---|
| 0 | 10.0 | 10.0 | None |
| 2 | 7.0 | 8.7 | 1.7 |
| 4 | 4.5 | 7.7 | 3.2 |
| 6 | 3.5 | 7.0 | 3.5 |
| 8 | 3.0 | 6.3 | 3.3 |
| 10 | 2.5 | 5.8 | 3.3 |
| 12 | 2.0 | 5.3 | 3.3 |
| 14 | 1.7 | 5.2 | 3.5 |
| 16 | 1.6 | 4.9 | 3.3 |

The comparative sugar concentration as measured in the two tests is shown in FIGURE 3.

EXAMPLE 5

1000 pounds of Idaho Russett potatoes were stored for 3 months at a temperature of about 40 degrees Fahrenheit. Analysis of said potatoes indicated the following results:

| | |
|---|---|
| Moisture content _____percent__ | 75 |
| Sugar content _____do____ | 3.0 |
| Yeast count _____ | 90 |
| Mold count _____ | 10,000 |

A second 1000 pounds of Idaho Russett potatoes were stored in a confined storage enclosure which was maintained at a substantially constant temperature of 48 degrees Fahrenheit. The atmosphere surrounding said potatoes was treated to contain about 0.01 part per million ozone and was maintained at a relative humidity of between 90 and 95 percent. Analysis of the potatoes thus stored showed the following results:

| | |
|---|---|
| Moisture content _____percent__ | 83 |
| Sugar content _____do____ | 0.05 |
| Yeast count (unpeeled) _____ | Negative |
| Yeast count (peeled) _____ | Negative |
| Mold count (unpeeled) _____ | Negative |
| Mold count (peeled) _____ | Negative |

The preceding examples are intended solely to illustrate modes of practice of my invention and to demonstrate the results obtainable thereby and are not intended to unduly limit the invention which is intended to be defined only by the steps and their obvious equivalents set forth in the following claims.

I claim:
1. A method for accelerating the respiration in harvested potatoes which comprises storing said potatoes at a temperature above 45° Fahrenheit in an atmosphere containing 0.001 to 10 parts per million ozone.
2. The method of claim 1 wherein the relative humidity of said atmosphere is maintained at 75 to 99 percent.
3. The method of claim 2 wherein said potatoes are stored at a temperature of 50 to 55° Fahrenheit.
4. The method of claim 3 wherein said potatoes are maintained at a substantially constant storage temperature between said 50 to 55° Fahrenheit.
5. The method of claim 4 wherein said atmosphere contains 0.005 to 0.1 part per million ozone.
6. The method of claim 2 wherein said relative humidity is maintained at 85 to 96 percent.
7. The method of claim 1 wherein said temperature is increased at the rate of 0.5 to 5° Fahrenheit per day until the shipping temperature of said potatoes is reached.
8. The method of claim 7 wherein the relative humidity of said atmosphere is maintained at 75 to 99 percent.
9. The method of claim 8 wherein said atmosphere contains 0.005 to 0.1 part per million ozone.
10. The method of claim 9 wherein said relative humidity is maintained at 85 to 96 percent.
11. A method for storing newly harvested potatoes to prevent sugar buildup which comprises storing said potatoes during their "sweat" period at a temperature of 45 to 55° Fahrenheit in an ozone environment having an ozone concentration of 0.001 to 10 parts per million.
12. The method of claim 11 wherein the relative humidity of said environment is maintained at 75 to 99 percent.
13. The method of claim 12 wherein said potatoes are stored at a temperature of 50 to 55° Fahrenheit.
14. The method of claim 13 wherein said potatoes are maintained at a substantially constant storage temperature between said 50 to 55° Fahrenheit.
15. The method of claim 14 wherein the temperature of said potatoes is increased at the rate of 0.5 to 5° Fahrenheit per day after said "sweat" period until the shipping temperature of said potatoes is reached.

References Cited
UNITED STATES PATENTS

| | | | |
|---|---|---|---|
| 716,558 | 12/1902 | Lacomme | 99—228 |
| 1,126,430 | 1/1915 | Elliott | 99—228 |
| 1,215,254 | 2/1917 | Darden | 99—228 |
| 1,975,541 | 10/1934 | Forrest | 99—271 |

OTHER REFERENCES

Emel 'Unov: "Ozone in the Service of Large-Scale Chemistry," Nature, No. 12, December 1963, pp. 106–108.

Talburt and Smith: Potato Processing, Air Publishing Co., 1959, Westport, Conn., p. 177.

A. LOUIS MONACELL, Primary Examiner.

WILLIAM A. SIMONS, Assistant Examiner.

U.S. Cl. X.R.
99—100, 156, 228